UNITED STATES PATENT OFFICE.

LUCIEN JUMAU, OF PARIS, FRANCE.

PROCESS OF OBTAINING PURE METALLIC COPPER FROM A SOLUTION OF A SALT OF COPPER.

No. 930,968.  Specification of Letters Patent.  Patented Aug. 10, 1909.

Original application filed January 19, 1907, Serial No. 353,064. Divided and this application filed April 21, 1908. Serial No. 428,413.

*To all whom it may concern:*

Be it known that I, LUCIEN JUMAU, citizen of France, residing at Paris, in the said Republic, have invented new and useful Improvements in Processes for Obtaining Pure Metallic Copper from a Solution of a Salt of Copper, (for which I have obtained a patent of addition in France, No. 6,825, bearing date October 27, 1906,) of which the following is a specification.

My invention relates to an improved process for obtaining pure metallic copper from a solution of a salt of copper, and it consists in the steps and processes herein described and claimed.

This application is a division of an application Serial No. 353,064, filed by me on or about January 19, 1907.

In the usual wet method of extracting copper from its ores, the ores, with or without previous roasting are leached with a suitable solution for dissolving the copper, the latter being usually extracted in the form of a sulfate.

According to my improved process, the solution containing salts of copper is heated, under pressure, to a high temperature in the presence of wood used in any form, such as saw-dust, shavings, waste wood and the like.

My said improved process is particularly advantageous when the ores do not contain sulfur, as it is then impossible to use as reducing agent, the sulfurous acid, furnished in an economical manner by the previous roasting of the said ores, as specified in the improved process which constitutes another division of the application Serial No. 353,064, filed by me on or about January 19, 1907.

According to the said process, the neutral or acid solution of copper sulfate is heated with wood, in a closed vessel, and under pressure; said solution thus treated yields metallic copper, and, as product of decomposition of the wood, organic acids and carbon dioxid that can be absorbed by putting the apparatus in which the solution is heated under pressure, into communication with a space filled with some absorbent of carbon dioxid, such as lime; however, the carbon dioxid may escape freely through the valve of the digester.

I have described my preferred process, but obviously, changes could be made within the spirit and scope of my invention.

Having thus described my invention, what I claim as new and desire to secure by Letters-Patent is:

1. The herein described process for obtaining pure copper from a solution containing salts of copper, which consists in subjecting said solution to heat and pressure in the presence of a suitable quantity of wood used in any form, such as saw-dust, shavings, waste wood and the like.

2. The herein described process for obtaining pure copper from a solution containing salts of copper, which consists in subjecting said solution to heat and pressure, in the presence of a suitable quantity of wood used in any form, such as saw-dust, shavings, waste wood and the like, and in putting the apparatus in which the reduction is effected, in communication with a space filled with some absorbent of carbon dioxid, such as lime and the like.

In testimony whereof, I have signed my name to this specification in the presence of two subscribing witnesses.

LUCIEN JUMAU.

Witnesses:
JULES FAYOLLET,
EUGÈNE PICHON.